J. E. & C. E. POINTON.
MACHINE FOR MIXING AND KNEADING DOUGH AND LIKE PLASTIC SUBSTANCES.
APPLICATION FILED FEB. 1, 1909.

959,963.

Patented May 31, 1910.

4 SHEETS—SHEET 1.

UNITED STATES PATENT OFFICE.

JOHN EDWARD POINTON AND CHARLES EDWARD POINTON, OF PETERBOROUGH, ENGLAND.

MACHINE FOR MIXING AND KNEADING DOUGH AND LIKE PLASTIC SUBSTANCES.

959,963.  Specification of Letters Patent.  Patented May 31, 1910.

Application filed February 1, 1909. Serial No. 475,395.

*To all whom it may concern:*

Be it known that we, JOHN EDWARD POINTON and CHARLES EDWARD POINTON, subjects of Great Britain, residing at Westwood Works, Peterborough, in the county of Northampton, England, have invented new and useful Improvements in Machines for Mixing and Kneading Dough and Like Plastic Substances, of which the following is a specification.

This invention relates to machines for mixing and kneading dough and like plastic substances, of the type in which a kneading arm or equivalent part operates in a circuitous path within a rotating trough or receptacle.

In the kneading of dough in a machine such as aforesaid, it is essential to the most efficient kneading action that the working or dough manipulating end of the arm or its equivalent, shall receive a slow movement as it travels through the dough, to avoid crushing or damage of the latter, and a quick withdrawal movement in order to obtain the necessary stretching of the dough and for effectual aeration. By the operation of the kneading arm in the manner described an economy also results in the driving of the machine as there is less fluctuation in the power required to propel the working end of the arm through its circuitous path.

Our invention comprises means as hereinafter described for the operation of the kneading arm in the manner aforesaid.

Figure 1:
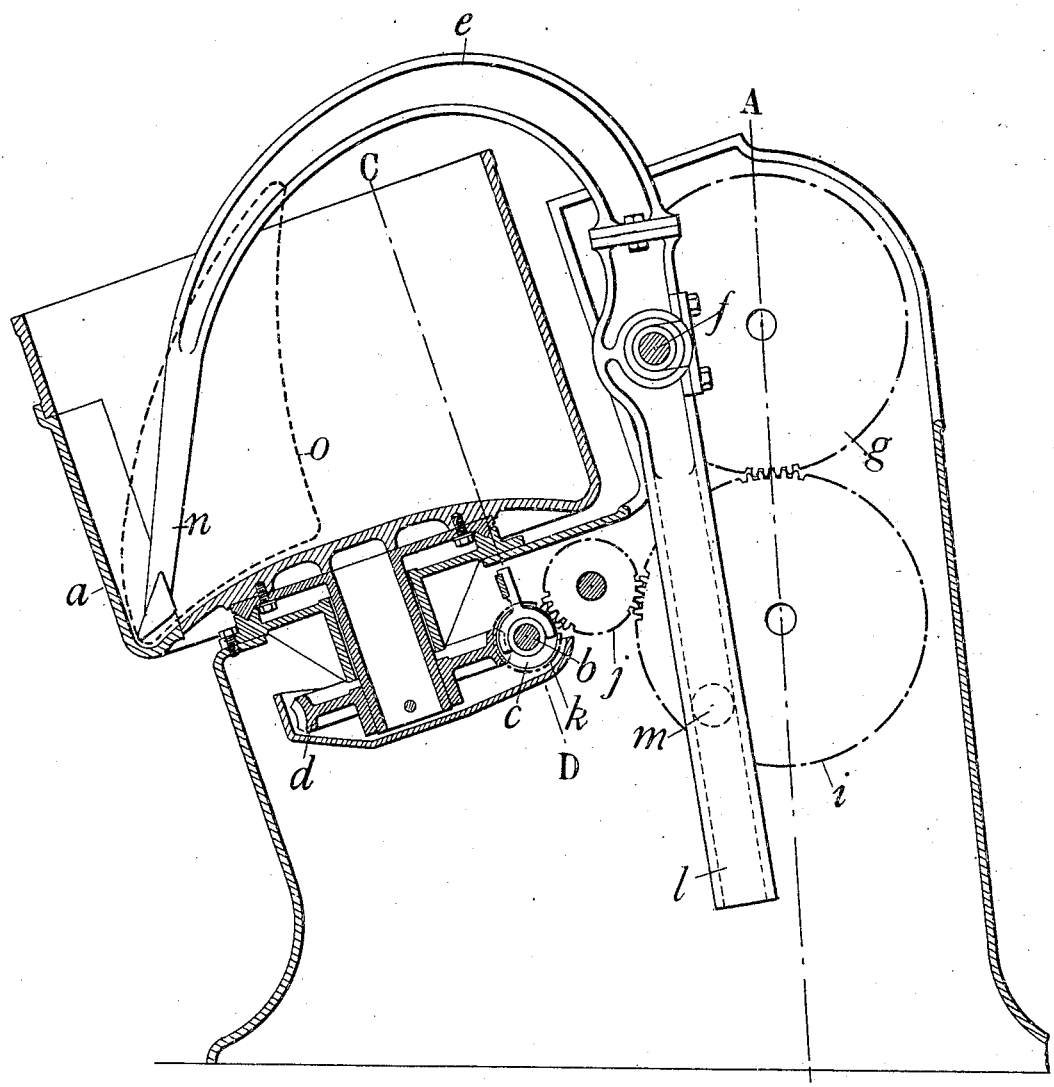
Figure 2:
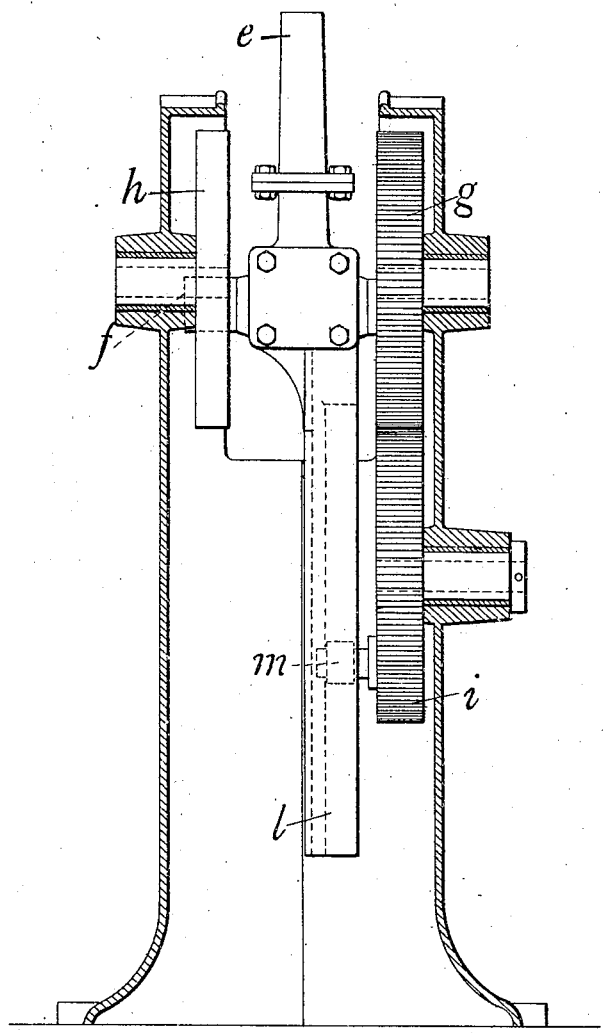
Figure 3:
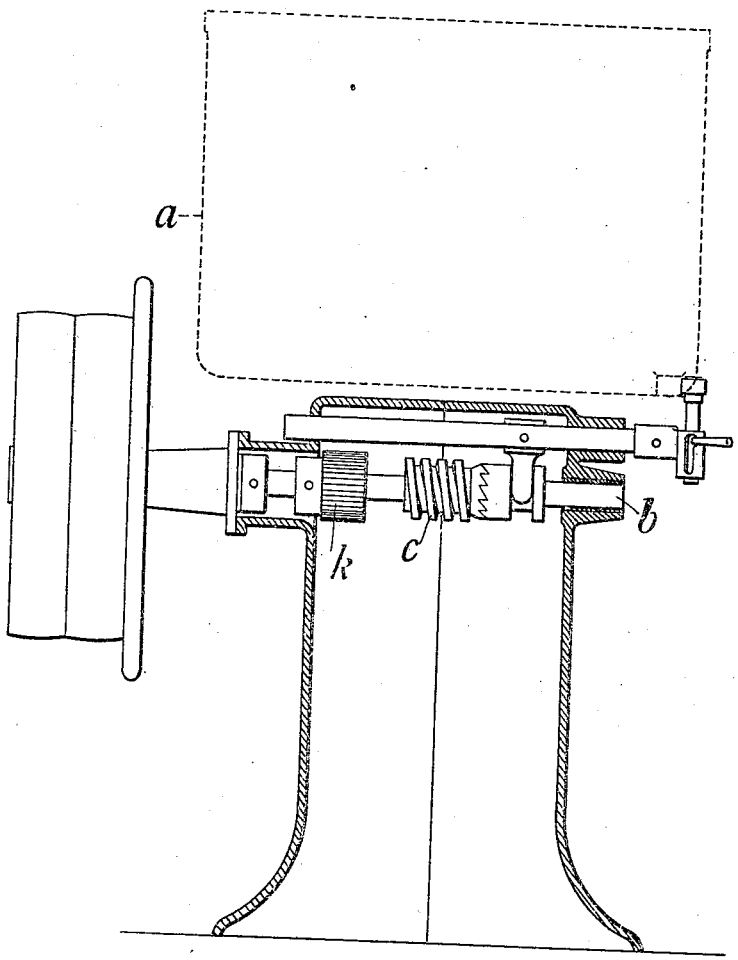
Figure 4:
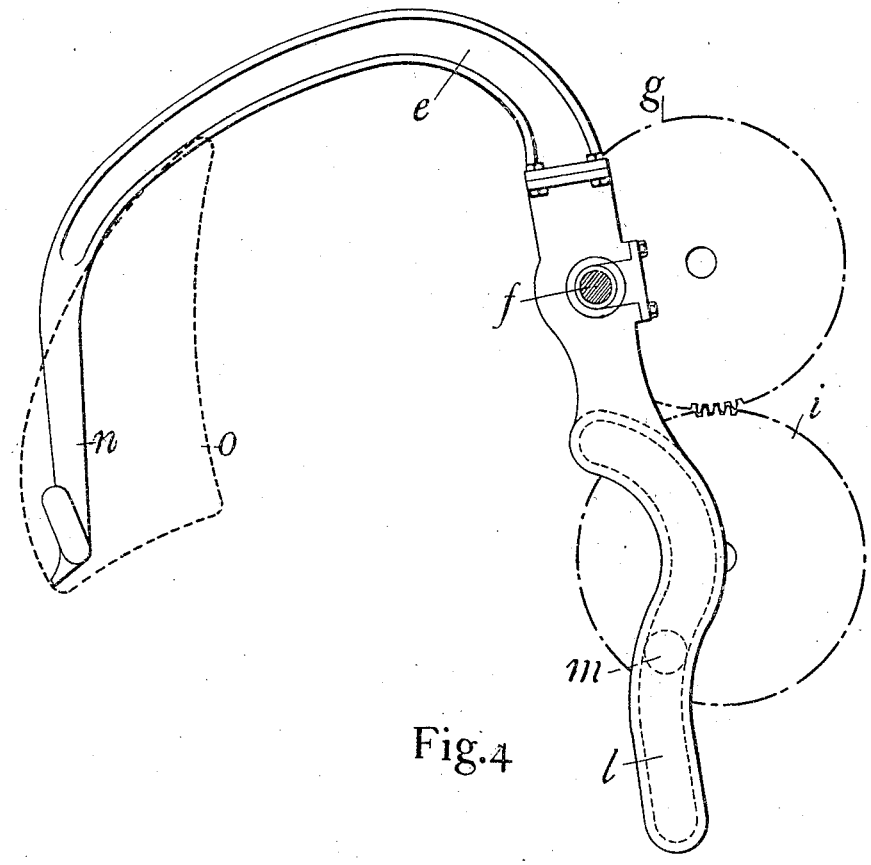

Referring to the four accompanying sheets of explanatory drawings;—Figure 1 is a sectional side elevation of a dough mixing or kneading machine having this invention applied thereto. Figs. 2 and 3 are respectively sectional end elevations on or adjacent to the lines A B, C D, Fig. 1; the gearing in the plane of section C D, is shown in full at Fig. 3. Fig. 4 illustrates a modified shape of the kneading arm.

The same reference letters in the different views indicate the same or similar parts.

The rotatable trough or receptacle $a$ for the dough to be mixed and kneaded is preferably mounted as shown in an inclined or tilted disposition upon the framing of the machine, such a disposition facilitating the withdrawal of the dough after treatment. The rotation of the trough is effected from the driving shaft $b$ through the medium of a worm $c$ and worm wheel $d$, the latter being secured to a trunnion like extension of the trough.

The kneading arm $e$ which is preferably of a swan neck shape, is pivotally mounted on a pin $f$ secured between a pair of crank elements $g$ and $h$ which rotate upon a common axis. The element $g$ comprises an ordinary spur wheel which through the medium of intermediate wheels $i$, $j$, $k$, is rotated from the driving shaft $b$ aforesaid. The wheel $i$ is of the same diameter as the crank wheel $g$. The arm $e$ is provided with a slotted rigid extension $l$ from the aforesaid pivot or crank pin $f$ and the said extension is engaged by a crank pin $m$ projecting from the wheel $i$. The crank pins $f$ and $m$ rotate in opposite directions in consequence of the gear connections of the elements on which they are mounted, and by their combined action upon the kneading arm, the working end $n$ of the latter which enters the rotating trough $a$ is moved in the required circuitous path indicated by the dotted lines $o$.

The respective crank pins $f$ and $m$ are set in any suitable relation (such as shown in Fig. 1) that will impart a slow movement to the working end of the kneading arm as it passes into or through the dough and a quick movement as it leaves or is withdrawn from the same. An effective kneading action without risk of damaging the dough is thereby assured; also the variation of speed inversely with the variation in the resistance to motion, results in a regularity of the demand upon the power whereby the machine is driven. The extension of the kneading arm may be engaged and operated by a cam instead of a crank pin as aforesaid. If desired we may arrange for the operation of two kneading arms, each in its own rotating trough or receptacle, by the one pair of crank disks; each of the latter will then have a pin projecting from both of its sides.

To obtain a different relation from that given by the arm above described between the speeds at which the kneading arm is pressed through the dough and withdrawn from the same, the extension $l$, of the arm may be curved as shown at Fig. 4 so that the crank pin $m$ operates in a curved slot instead of a straight one. With the curved arm the path of the end $n$ of the arm is also varied as will be seen from the dotted lines indicated by $o$. By suitably shaping the arm extension $l$, any desired path and speed relation in the up and down movements of the operative extremity n can be produced.

Having thus described our invention what we claim as new and desire to secure by Letters Patent is;—

1. In machines for mixing and kneading dough and like plastic materials, the combination of a rotatable trough or dough receptacle, a kneading arm having one end arranged to operate in the trough and the other situated at one side of the trough, a pivot situated at one side of the trough, and supporting one end of the said kneading arm, means for traversing the said pivot through a circular path, a bar in rigid connection with the pivoted end of the kneading arm, an element movably engaging said bar and adapted to move relatively thereto and means for traversing the said element through a circular path, said pivot and said engaging element being so positioned relatively to one another and to the centers of the paths through which they travel that a slow movement will be imparted to the end of the kneading arm as it passes from the upper to the lower portion of the trough and a quick movement will be imparted to said arm as it passes from the lower to the upper portion of said trough substantially as described.

2. In machines for mixing and kneading dough and like plastic materials, the combination of a rotatable trough or dough receptacle, a kneading arm having one end arranged to operate in the trough and the other situated at one side of the trough, a pivot situated at one side of the trough and supporting one end of the said kneading arm, a bar in rigid connection with the pivoted end of the kneading arm, an element movably engaging said bar and adapted to move relatively thereto, and means for the synchronous traversing of the said pivot and the said engaging element through circular paths, said pivot and said engaging element being so positioned relatively to one another and to the centers of the paths through which they travel that a slow movement will be imparted to the end of the kneading arm as it passes from the upper to the lower portion of the trough and a quick movement will be imparted to said arm as it passes from the lower to the upper portion of said trough substantially as described.

3. In machines for mixing and kneading dough and like plastic materials, the combination of a rotatable trough or dough receptacle, a kneading arm having one end arranged to operate in the trough and the other situated at one side of the trough, a pivot situated at one side of the trough and supporting one end of the said arm, a slotted bar in rigid connection with the pivoted end of the kneading arm, an engaging element for the said bar, and a pair of inter-engaging gear wheels having the said pivot and the said engaging element respectively secured thereto, substantially as described.

4. In machines for mixing and kneading dough and like plastic materials, the combination of a rotatable trough or dough receptacle, a kneading arm having one end arranged to operate in the trough and the other end situated at one side of the trough, a pivot situated at one side of the trough and supporting one end of said kneading arm, means for traversing the said pivot through a circular path, a bar in rigid connection with the pivoted end of the kneading arm, an engaging element for the said bar, and means for traversing the said element through a circular path, said pivot and said engaging element being so positioned relatively to one another and to the centers of the paths through which they travel that a slow movement will be imparted to the end of the kneading arm as it passes from the upper to the lower portion of the trough and a quick movement will be imparted to said arm as it passes from the lower to the upper portion of the trough.

In testimony whereof we have signed our names to this specification in the presence of two subscribing witnesses.

JOHN EDWARD POINTON.
CHARLES EDWARD POINTON.

Witnesses:
  ALBERT E. BARKER,
  ALFRED A. KRAUS.